United States Patent [19]

Cullen

[11] Patent Number: 4,565,426

[45] Date of Patent: Jan. 21, 1986

[54] BEAM SPLITTER

[76] Inventor: Ralph A. W. Cullen, 84, Wimbourne Rd. West, Dorset, England, BH 212 DP

[21] Appl. No.: 490,718

[22] Filed: May 2, 1983

[51] Int. Cl.⁴ .............................................. G02B 27/10
[52] U.S. Cl. ..................................................... 350/401
[58] Field of Search ............... 350/400, 401, 168, 170, 350/402

[56] References Cited

U.S. PATENT DOCUMENTS 3,195,397  7/1965  Clapp ................................... 350/168
3,495,892  2/1970  Dailey .................................. 350/401

OTHER PUBLICATIONS

Jenkins et al., *Fundamentals of Optics*, pp. 21-22, McGraw-Hill, 1957.

*Primary Examiner*—Bruce Y. Arnold
*Attorney, Agent, or Firm*—Lerner, David, Littenberg, Krumholz & Mentlik

[57] ABSTRACT

The invention provides beam splitter for use in high power multi-wavelength laser holography. The beam splitter comprises a bi-refringent prism 12 through which passes the beam to be split the prism 12 splitting the beam into two separate beams having mutually orthogonal polarization planes. A half-wave plate 16,18 is arranged in the path of at least one of the separated beams to enable the planes of polarization of the separated beams to be realigned. Two further prisms 14, each arranged in the path of a respective one of the separated beams, serve to compensate for the dispersion of the wavelengths of the incident beam by the bi-refringent prism 12.

5 Claims, 1 Drawing Figure

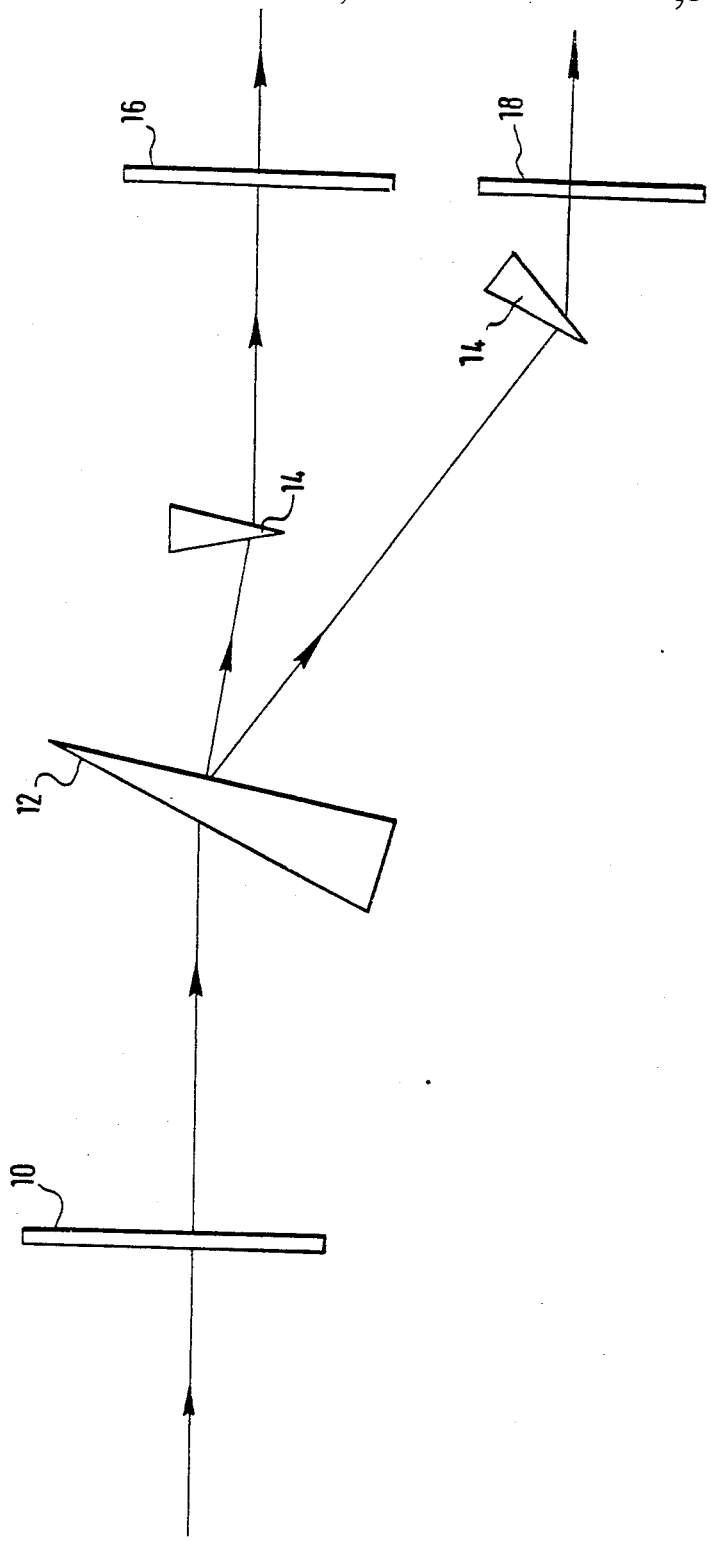

BEAM SPLITTER

The present invention relates to a beam splitter. The invention seeks in particular to provide a beam splitter for dividing a high power laser beam, for example of twenty watts, into a reference beam and an object beam for use in holography.

DESCRIPTION OF PRIOR ART

There are known from other applications several forms of beam splitter which cannot be used in high power multiwavelength holography.

British Patent Specification No. 580,869 in common with other known arrangements, such as British Patent Specification No. 1,332,304 employs cemented components in order to split the beam. The boundaries of such cemented components are not capable of withstanding exposure to a high power laser beam and such arrangements cannot be employed. The last mentioned Patent also uses dichroic prisms to separate the different wavelengths and in the present application, by contrast, it is important to minimize such separation.

There are also known arrangements in which the input beam is split into two beams by relying on certain materials which have different refractive indices depending on the polarisation of the incident light. In British Patent Specification No. 536,465 there is described a bi-refringent prism arranged such that one polarization of light undergoes total internal reflection in the prism while the other is merely refracted by the prism. This arrangement cannot be used for multiwavelength light since there is a range of refraction angles for the different wavelengths of each polarization and the ranges may overlap so that total separation of the two polarizations cannot be effected. Furthermore, the two beams are dispersed by the action of the bi-refringent prism and the separated beams cannot be used immediately as the object and reference beam to produce a hologram.

British Patent Specification No. 2 005 043 describes an arrangement for use in telecommunications where a beam is split by passing through a parallel sided bi-refringent block. This allows adequate separation when using fiber optics but the separation is totally inadequate for the purpose of laser holography. Also, in telecommunication one is normally concerned with monochromatic light and the power levels are significantly lower than those contemplated in the present invention.

OBJECT OF THE INVENTION

The object of the present invention is to provide a beam splitter for use in a multi-wavelength high power laser holography which, without relying on the use of cemented components allows a beam to be split into an object beam and a reference beam, without angular dispersion of the different wavelengths in either one of the beams.

SUMMARY OF THE INVENTION

In accordance with the present invention, there is provided a splitter which comprises a bi-refringent prism through which the beam to be split is arranged to pass and operative to split the beam into two separate beams having mutually orthogonal polarization planes, a half-wave plate arranged in the path of at least one of the separated beams to enable the planes of polarization of the separated beams to be realigned, and two further prisms each arranged in the path of a respective one of the separated beams and operative to compensate for the dispersion of the wavelengths of the incident beam by the bi-refringent prism.

It is also desirable in holography to be able to vary the power of the object beam relative to the reference beam. This is because the power levels need to be in an optimum ratio in the plane of the hologram and whereas the reference beam travels a fixed path and undergoes a known attenuation, the power of the reflected object beam in the plane of the hologram will depend on the distance of the object and the reflectivity of its surface.

According to a preferred feature of the invention, a half-wave plate is rotatably mounted in the path of the beam incident upon the bi-refringent prism in order to vary the relative power of the separated beams.

The invention will now be described further, by way of example, with reference to the accompanying drawing, which is a schematic plan representation of the layout of a variable beam splitter in accordance with the invention.

In the accompanying drawing, linearly polarized light from a laser enters into a half wave plate 10 by means of which the plane of polarization can, if desired, be rotated. The light then falls upon a bi-refringent prism 12 made of calcite. Calcite exhibits different refractive indices in mutually orthogonal planes of polarization, the crystal having a slow axis and a fast axis. The components of the polarized light along the slow axis and the fast axis are refracted by different amounts and emerge as two separate beams.

The path of the light through the prism is arranged to correspond to the angle of minimum deviation of the beam. As the angle of deviation is at a minimum, small variations in the angle of incidence can be tolerated and furthermore, the effects of dispersion are minimized. To assist further in reducing dispersion, prisms 14 which may for economy be made of glass rather than calcite, are arranged in the paths of the two separated beams in order to counteract any dispersion resulting from the calcite prism 12 making the beam splitter particularly useful for use with multi-wavelength lasers.

Two half wave plates 16 and 18 are arranged in the path of the two separated beams allowing the polarization planes of both the output beams to be rotated if desired. In holography, the interfering reference and object beam must be of the same polarization and though one half wave plate would suffice to enable this requirement to be met, it is often advantageous to provide two, so as to enable both polarization planes to be varied at will.

By rotating the half wave plate 10, the polarization plane of the incoming light with reference to the slow and fast axes of the calcite crystal can be varied thus enabling the ratio of the intensities of the two output beams to varied at will.

The apparatus has been termed a beam splitter but it can be used merely as an attenuator if only one of the two outward beams is put to practical use. The energy in the other beam may, if desired, be absorbed by, for example, a block of metal.

In a practical embodiment all the elements of the beam splitter are arranged in a common housing, not shown in the drawing, which may conveniently be formed mostly of aluminium, the interior surfaces being black coated or anodized in order to minimize internal reflections.

Known dielectric coating techniques may be employed at the various optical surfaces also for the purpose of reducing internal reflections.

I claim:

1. A beam splitter for use in high power multi-wavelength laser holography, comprising a bi-refringent prism through which the beam to be split is arranged to pass and operative to split the beam into two separate beams having mutually orthogonal polarization planes, said bi-refringent prism causing a predetermined degree of dispersion of said two separate beams, a half-wave plate arranged in the path of at least one of the separated beams to be realigned, and first and second additional prisms arranged in the paths of each of said two separate beams to compensate for said dispersion of the wavelength of the incident beam by said bi-refringent prism.

2. The beam splitter of claim 1, wherein said beam to be split is arranged to pass through the bi-refringent prism in a manner such that one of said two separated beams is at the angle of minimum deviation.

3. The beam splitter of claim 1, wherein said half-wave plate arranged in the path of at least one of said separated beams comprises a first half-wave plate, and including a second half-wave plate arranged in the path of said beam incident upon said bi-refringent prism, said second half-wave plate being rotatable to enable the relative power of said separated beams to be varied.

4. The beam splitter of claim 1, wherein said half-wave plate comprises a first half-wave plate, and including a second half-wave plate, said first and second half-wave plates being arranged in the paths of both of said separated beams to allow the planes of rotation of both said separated beams to be rotated.

5. The beam splitter of claim 1, wherein said bi-refringent prism comprises calcite.

* * * * *